(12) United States Patent
Schneider et al.

(10) Patent No.: US 9,300,533 B2
(45) Date of Patent: Mar. 29, 2016

(54) FIELD BUS DEVICE

(75) Inventors: Rene Schneider, Minden (DE); Stefan Zudse, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 1009 days.

(21) Appl. No.: 12/613,556

(22) Filed: Nov. 6, 2009

(65) Prior Publication Data
US 2010/0135311 A1   Jun. 3, 2010

(30) Foreign Application Priority Data
Nov. 18, 2008   (DE) .......................... 10 2008 058 033

(51) Int. Cl.
| | |
|---|---|
| *H04L 12/54* | (2013.01) |
| *H04L 12/24* | (2006.01) |
| *H04L 12/40* | (2006.01) |
| *H04L 29/08* | (2006.01) |
| *H04L 29/06* | (2006.01) |

(52) U.S. Cl.
CPC ...... *H04L 41/0806* (2013.01); *H04L 12/40006* (2013.01); *H04L 41/0253* (2013.01); *H04L 67/125* (2013.01); *H04L 69/08* (2013.01); *H04L 2012/4026* (2013.01)

(58) Field of Classification Search
None
See application file for complete search history.

(56) References Cited

U.S. PATENT DOCUMENTS

| | | | | |
|---|---|---|---|---|
| 7,010,294 | B1 * | 3/2006 | Pyotsia et al. ................. | 455/420 |
| 7,634,555 | B1 * | 12/2009 | Wainscott et al. ............ | 709/223 |
| 8,200,783 | B2 * | 6/2012 | Eryurek et al. ................ | 709/218 |
| 2002/0178295 | A1 * | 11/2002 | Buczek et al. ................. | 709/250 |
| 2007/0226318 | A1 * | 9/2007 | Rydberg et al. ............... | 709/218 |

FOREIGN PATENT DOCUMENTS

| | | |
|---|---|---|
| DE | 103 47 007 | 4/2005 |
| DE | 10 2004 045 240 | 3/2006 |
| EP | 1 349 024 | 10/2003 |
| EP | 1 569 055 | 8/2005 |
| EP | 1 906 274 | 4/2008 |
| WO | WO 2004/014022 | 2/2004 |

OTHER PUBLICATIONS

Romkey, "A Nonstandard for Transmission of IP Datagrams over Serial Lines: SLIP," Jun. 1988, pp. 1-6, Network Working Group.
Simpson, "The Point-to-Point Protocol (PPP)," Jul. 1994, pp. i-52, Network Working Group.
Hein et al., "TCP/IP light," ISBN 3-931959-04-X, 1997, pp. 4-10.

* cited by examiner

*Primary Examiner* — Faruk Hamza
*Assistant Examiner* — Aixa Guadalupe-Cruz
(74) *Attorney, Agent, or Firm* — Renner, Otto, Boisselle & Sklar, LLP

(57) ABSTRACT

A field bus device (2) having a control unit (18), at least one field bus port (6, 13) for connecting the control unit (18) to a field bus (7, 4), and having a serial interface (11) for the data connection of the field bus device (2) to a configuration device (12) is described. The field bus device (2) has a web server platform (14) implemented in it which can be addressed using the TCP/IP protocol, wherein the web server platform (14) is set up to configure the field bus device (2). The field bus device (2) has a protocol converter (15) for converting the data transmission protocol for the serial interface (11) to the TCP/IP protocol and vice versa such that the configuration device (12) can use the web server platform (14) for access using data packets which are transmitted via the serial interface (11) and which are based on the TCP/IP protocol.

6 Claims, 2 Drawing Sheets

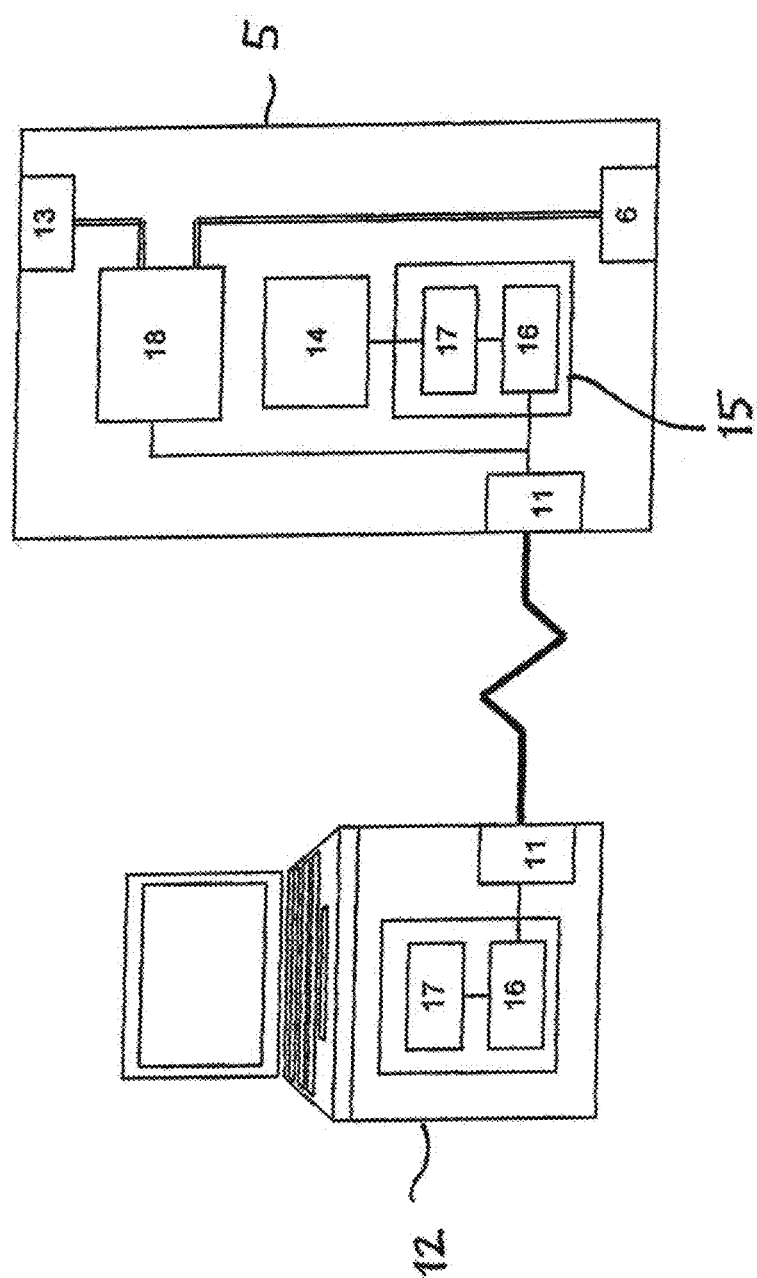

FIELD BUS DEVICE

FIELD OF THE INVENTION

The invention relates to a field bus device having a control unit, at least one field bus port for connecting the control unit to a field bus, and having a serial interface for the data connection of the field bus device to a configuration device. The field bus device has a web server platform implemented in it which can be addressed using the TCP/IP protocol and which is set up to configure the field bus device.

BACKGROUND

In automation engineering, field bus devices are used in order to control bus subscribers with the aid of process data or to pick up process data from bus subscribers for further control and/or monitoring. The field bus devices are usually configured using a superordinate computer which is connected to a configuration interface or via the field bus to the field bus device. The configuration is usually performed on the field bus couplers, which are a special form of field bus devices which can firstly be connected via a field bus to superordinate or coordinate devices and to further field bus couplers or control/monitoring computers and can secondly be connected via an internal (field) bus to further field bus devices in the form of input and/or output modules (I/O modules).

One particularly advantageous configuration option for processor-controlled devices is provided by what are known as web server platforms, which are implemented in the device to be configured and allow data interchange with a configuration device using the TCP/IP (Transmission Control Protocol/Internet Protocol) protocol and the HTML-based Internet transmission standard. A web server has the advantage of being platform-independent. In this case, the communication guidelines are implemented in the field bus device, and the configuration device requires only a generally valid browser (e.g. Internet Explorer from Microsoft or Firefox) to display the content of the web server platform. The installation of a specific configuration program in the configuration device is not required. On the contrary, the configuration platform is implemented at run time by the field bus device in the browser of the configuration device.

A web server can be used not just to set parameters but also to perform more complex configurations. Thus, the web server can be used to provide a complex development environment for programmable field bus devices, for example, in order to set up said field bus devices and to create programs for the field bus devices, as disclosed in DE 10 2004 045 240 A1, for example.

However, a web server platform requires an Ethernet interface between the field bus device and the configuration device in order to allow data interchange by means of the TCP/IP protocol data packets between the field bus device and the web server platform implemented thereon and the configuration device.

The implementation of a web server platform in a field bus device is known from DE 103 47 007 A1, for example. The function blocks equipped with a web server function can be called by superordinate devices, such as control systems or control units, via Ethernet-compatible field buses and provide information as HTML pages in a general description language.

Since web servers are based on a TCP/IP protocol and the Ethernet data transmission standard, web servers have to date been able to be used in field bus devices only if such an Ethernet interface is present.

On the other hand, web servers provide the advantage of providing a platform-independent, general configuration platform, and may significantly reduce the development and configuration complexity.

US 2002/0178295 A1 describes a USB access point, managed by remote control, to a multiplicity of different kinds of USB peripheral devices using a web server implemented with a service provider. The USB access point is accessed via an Ethernet interface and the Internet. A protocol converter is provided in the USB access point in order to convert information transmitted via the Internet in the TCP/IP format into a protocol which is compatible with the USB standard and with the USB peripheral device connected to the USB interface.

SUMMARY

The object of the present invention is therefore to provide an improved configuration option also for field bus devices which do not support the Ethernet and TCP/IP protocols by means of their external interfaces.

The object is achieved by means of the field bus device having the features of claim 1.

The "peer-to-peer" access of a configuration device with a point-to-point connection to the web server platform of the field bus device is effected via a serial interface by virtue of the field bus device having a protocol converter for converting the data transmission protocol for the serial interface to the TCP/IP protocol and vice versa such that the configuration device can communicate with the web server platform using data packets which are transmitted via the serial interface and which are based on the TCP/IP protocol.

Use is made of the fact that in most cases field bus devices, particularly field bus couplers/field bus controllers, and also standard personal computers have a USB (Universal Serial Bus) port, an RS232 interface or wireless serial interfaces, such as Bluetooth or the like, which can be used to interchange data. If a field bus device does not have an Ethernet interface which allows access to a web server platform which requires an Ethernet connection, it is nevertheless possible to implement a web server platform. This is achieved by virtue of a protocol converter which handles logical Ethernet-compatible data communication with the web server platform physically using the serial interface as an external interface of the field bus device. A virtual Ethernet interface is therefore used to allow data interchange via the external serial interface of the field bus device for the purpose of configuring the field bus device using the web server platform.

Although the external interfaces of the field bus device do not actually allow a web server functionality, a web server platform is nevertheless implemented, wherein the web server platform is accessed externally not via an Ethernet interface but rather via a serial interface which does not actually support web servers. In the field bus device, an Ethernet interface is then emulated behind the external serial interface and can then access the web server in the usual way using the TCP/IP protocol and the Internet description language, e.g. HTML.

Advantageous embodiments are described in the subclaims.

DESCRIPTION OF THE DRAWINGS

The invention is explained in more detail below using an exemplary embodiment with reference to the appended drawings, in which:

FIG. 2 shows a block diagram of a field bus device with an integrated web server and USB interface and also a configuration device connected thereto.

DETAILED DESCRIPTION

Figure 1:
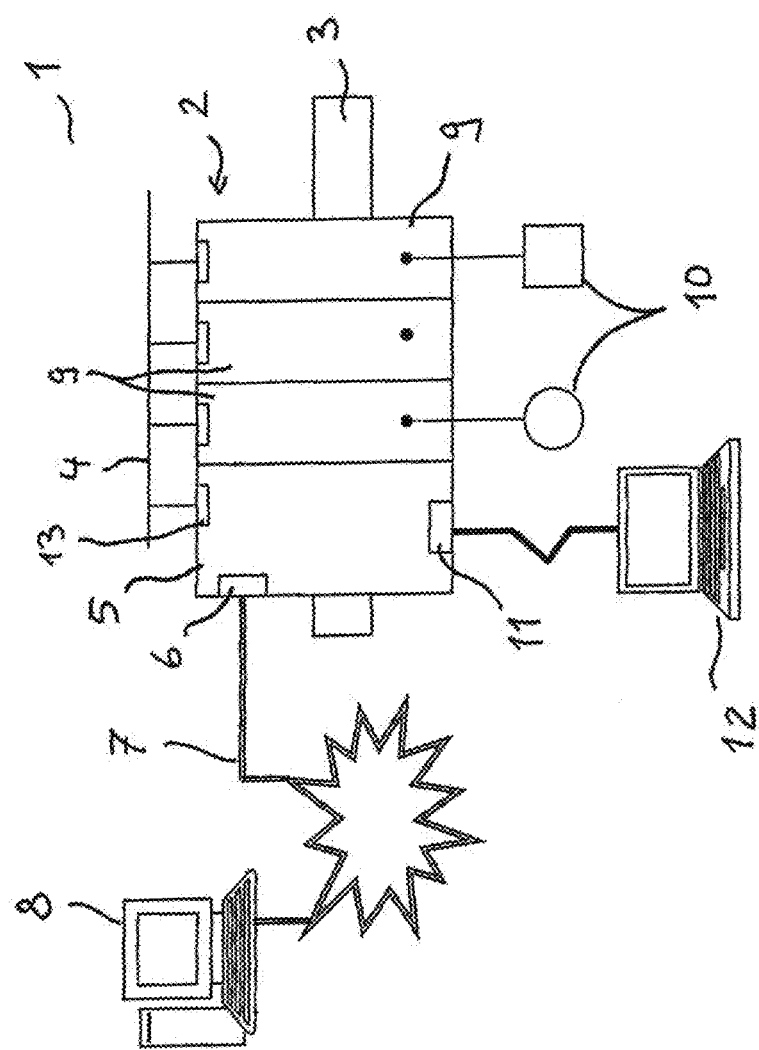
FIG. 1 shows a block diagram of an automation system with field bus devices.

FIG. 1 shows a block diagram of an automation system 1 which has a multiplicity of field bus devices 2 which are networked to one another. By way of example, the field bus devices 2 may be latched onto a top-hat rail 3 next to one another. This sets up an internal (field) bus 4 via bus ports 13 on the field bus devices 2, said internal (field) bus being used to connect the field bus devices 2 to one another.

At the head of the array of field bus devices 2 there is a field bus coupler 5 (field bus controller) with a field bus port 6 for an external field bus 7, to which superordinate or coordinate control and/or monitoring devices 8 are connected. Serial control and/or monitoring devices 8 may be workstations, personal computers or else further field bus controllers with field bus devices 2 connected thereto.

Whereas one embodiment of field bus devices 2 is the field bus controller 5, particularly the field bus devices 2 connected downstream of the field bus controller 5 may be input and/or output modules 9, for example, for connecting bus subscribers 10, such as sensors and actuators.

By way of example, at least the field bus coupler 5 has a serial interface 11 for connecting local peripheral devices. The serial interface 11, preferably based on the Universal Serial Bus standard USB, can be used to connect particularly a configuration device 12 which can be used to configure the field bus coupler 5 and possibly also the further field bus devices connected thereto. Configuration is understood to mean the setting of software or hardware of the field bus device 2, including the program and driver installation and the parameterization of the field bus devices 2 and also the processes performed by the latter.

FIG. 2 shows a block diagram of one of the field bus devices 2, namely the field bus coupler 5 with the configuration device 12 connected thereto via the USB interface 11, for example. It can be seen that the field bus device 5 has, as an external interface, the serial USB interface 11 and also at least one field bus port 6 for networking to external subscribers and also to a bus port 13 for the internal (field) bus 4.

In addition, the field bus device 2 has a web server platform 14 implemented in it which can be retrieved via the USB interface 11 as a gateway. It is therefore possible for the other field bus ports 6 and 13 to be non-Ethernet-compatible network interfaces too.

Since a web server platform 14 basically requires communication using the TCP/IP protocol in order to display an application in a standard browser, and to execute it under a standard description language, such as HTML, in a remote device, namely the configuration device 12, the serial USB interface 11 in the field bus device 2 has a protocol converter 15 on it which is placed on the USB stack of the USB interface 11 with an Ethernet communication driver 16. The Ethernet communication driver 16, for its part, allows data communication with the web server 14 via a TCP/IP stack. An appropriate virtual Ethernet connection via the USB interface 11 is implemented in the configuration device 12, so that the serial USB interface 11 can be used by the configuration device 12 to access the web server platform 14 of the field bus device 2 on the basis of the TCP/IP protocol. The Ethernet-compatible data packets, which are required for the configuration device 12 to access the run time environment on the field bus device 2 using the web server platform 14, are therefore matched to the USB gateway by the protocol converter 15—which can be implemented in software—in the field bus device 2 and accordingly in the configuration device 12 by means of a virtual Ethernet connection.

The process-based control of the field bus devices 2 is effected using a control unit 18 which may have a programmable microcontroller, microprocessor or ASIC.

The invention claimed is:

1. A programmable field communication bus device comprising:
    a control unit arranged to control or monitor bus scribers;
    at least one field communication bus port for connecting the control unit to a field bus;
    a serial interface for a data connection of the field communication bus device to a configuration device;
    a web server platform operable by said field communication bus device which can be addressed using a TCP/IP protocol, wherein the web server platform is set up to configure the field communication bus device; and
    a protocol converter operable by said field communication bus device for converting a data transmission protocol of a data transmission from the serial interface to the TCP/IP protocol and vice versa such that the configuration device communicates with the web server platform using data packets which are transmitted via the serial interface and which are based on the TCP/IP protocol,
    wherein the serial interface does not handle the data transmission via the data connection using either an Ethernet data transmission standard or the TCP/IP protocol.

2. The field communication bus device as claimed in claim 1, wherein the serial interface is a USB (Universal Serial Bus) interface or an RS232 interface.

3. The field communication bus device as claimed in claim 1, wherein the serial interface is set up for wireless data transmission.

4. The field communication bus device as claimed in claim 1, wherein the field bus does not handle the data transmission via the field communication bus using either an Ethernet data transmission standard or the TCP/IP protocol.

5. The field communication bus device as claimed in claim 1, wherein the web server platform is configured to transmit and display status and/or process data of the field communication bus device on the configuration device.

6. The field communication bus device as claimed in claim 1, wherein the web server platform is configured to receive and forward status and/or process data from the configuration device to said bus subscribers.

\* \* \* \* \*